United States Patent [19]

Meyer-Pittroff

[11] Patent Number: 4,662,902
[45] Date of Patent: May 5, 1987

[54] EVAPORATION COOLING TOWER

[75] Inventor: Roland Meyer-Pittroff, Eckental, Fed. Rep. of Germany

[73] Assignee: Kraftwerk Union Aktiengesellschaft, Mülheim, Fed. Rep. of Germany

[21] Appl. No.: 757,626

[22] Filed: Jul. 22, 1985

[30] Foreign Application Priority Data

Jul. 26, 1984 [DE] Fed. Rep. of Germany ....... 3427664

[51] Int. Cl.$^4$ ............................ B03C 3/49; B01F 3/04
[52] U.S. Cl. ....................................... 55/122; 261/160; 261/DIG. 11; 261/DIG. 77; 55/154
[58] Field of Search ............... 261/DIG. 77, DIG. 11, 261/160; 55/154, 122

[56] References Cited

U.S. PATENT DOCUMENTS

| | | | |
|---|---|---|---|
| 1,604,553 | 10/1926 | Hechenbleikner | 55/154 |
| 2,273,194 | 2/1942 | Hedberg et al. | 55/122 |
| 3,600,653 | 8/1971 | Hall | 261/DIG. 77 |
| 3,731,461 | 5/1973 | Hamon | 261/DIG. 77 |
| 3,846,519 | 11/1974 | Spangemacher | 261/DIG. 77 |
| 3,851,702 | 12/1974 | Heller et al. | 261/DIG. 77 |
| 3,923,935 | 12/1975 | Cates | 261/DIG. 77 |
| 3,934,817 | 1/1976 | Barry et al. | |
| 4,098,854 | 7/1978 | Knirsch et al. | 261/DIG. 77 |
| 4,246,010 | 1/1981 | Honacker | 55/154 |
| 4,514,344 | 4/1985 | Ruscheweyh | 261/DIG. 77 |

FOREIGN PATENT DOCUMENTS

| | | |
|---|---|---|
| 1943067 | 3/1971 | Fed. Rep. of Germany . |
| 2602485 | 8/1977 | Fed. Rep. of Germany . |
| 730332 | 10/1932 | France . |
| 1458957 | 10/1966 | France . |
| 418320 | 10/1934 | United Kingdom ....... 261/DIG. 77 |

Primary Examiner—Tim Miles
Attorney, Agent, or Firm—Herbert L. Lerner; Laurence A. Greenberg

[57] ABSTRACT

An evaporation cooling tower, includes an outer tower wall defining an interior of the cooling tower having upper and lower regions, the wall having ambient air intake holes formed in the periphery thereof at the lower region, a cooling water trickling system disposed in the interior of the cooling tower through which ambient intake air flows, electrostatic discharge shafts at the upper region for receiving relatively moist and warm exhaust air and precipitating fine water droplets therefrom, and a device for admixing relatively cool ambient air to the warm and moist exhaust air flowing to the discharge shafts.

11 Claims, 4 Drawing Figures

EVAPORATION COOLING TOWER

The invention relates to an evaporation cooling tower with intake openings for the ambient air provided at the lower periphery of the tower and a cooling water trickling system through which the intake air flows.

Evaporation cooling towers of this type are known. They are built either in relatively large sizes a natural-draft cooling towers or in smaller sizes as forced-ventilation cooling towers. The ambient intake air enters the lower rim of the cooling tower of such evaporation cooling towers, flows through a cooling water trickling system in which the water to be cooled precipitates down, and leaves the cooling tower heated and moisture-laden through its upper, central opening. In the process, the water is cooled through heat exchange with the air, but primarily through evaporation. The natural-draft cooling tower utilizes the buoyancy of the exhaust air which is warmer than the ambient air to take in new ambient air, whereas a blower takes care of the air flow in the forced-ventilation cooling tower. This is why the forced-ventilation cooling tower can also be built with less height. In both cases, the warm and moist exhaust air mixes with the colder ambient air above the cooling tower. In so doing the dew point is exceeded and small droplets of humidity are formed, which makes the cooling tower visible from a distance.

Another known device is a so-called forced-ventilation hybrid cooling tower in which the formation of clouds is prevented due to the fact that ambient air is heated in heat exchangers through which warm cooling waterflows and to which moist and warm exhaust air is admixed before the air leaves the cooling tower. Due to the relatively dry, heated ambient air being mixed with the warm and moist exhaust air from the cooling water trickling system, the relative humidity of the exhaust air leaving the cooling tower is reduced so that cooling tower clouds can be diminished and even avoided completely under favorable climatic conditions. It is also a characteristic of this hybrid cooling tower that the technical complexity required to heat the ambient air in the heat exchangers of the dry part is considerably greater than for a comparable cooling capacity in the wet part. Furthermore, in order to reliably prevent cloud formation, this dry cooling part must furnish the majority of the cooling capacity of the cooling tower.

It is also known from U.S. Pat. No. 3,934,817 to improve visibility which has been reduced by cooling tower clouds on roads which pass cooling towers, by running high voltage lines parallel to the traffic lanes. The upper edge of the cooling tower should then be flush with the ground surface serving as a counter electrode. It is obvious that this apparatus would bring with it a multiplication of the construction costs and would cause considerable power generating costs during operation. Beyond this, a reduction of the cloud formation might be achieved with such an apparatus.

It is accordingly an object of the invention to provide an evaporation cooling tower which overcomes the hereinafore-mentioned disadvantages of the heretofore-known devices of this general type, and to find a way of reducing or even preventing cooling tower clouds in a evaporation cooling tower with the least possible technical expense and with the least possible energy consumption.

With the foregoing and other objects in view there is provided, in accordance with the invention, an evaporation cooling tower, comprising an outer tower wall defining an interior of the cooling tower having upper and lower regions, the wall having ambient air intake or aspiration holes formed in the periphery thereof at the lower region, a cooling water trickling system disposed in the interior of the cooling tower through which ambient intake or aspirated air flows, electrostatic discharge shafts at the upper region for receiving relatively moist and warm exhaust air and precipitating fine water droplets therefrom, and means for admixing relatively cool ambient air to the warm and moist exhaust air flowing to the discharge shafts.

In accordance with another feature of the invention the discharge shafts include collecting devices for the precipitated water and collecting electrodes.

In accordance with a further feature of the invention the cooling tower has a given cross-sectional discharge area and the discharge shafts cover all of the given discharge area.

In accordance with an added feature of the invention the admixing means includes cooling air blowers disposed directly below the discharge shafts in vicinity of the outer tower wall for blowing cooling air into the cooling tower.

In accordance with an additional feature of the invention the admixing means include cold air distribution systems connected to the cooling air blowers for mixing the ambient air with the warm and moist exhaust air blowing to the discharge shafts and for imparting a vertical flow component to the air.

In accordance with again another feature of the invention there are provided heat exchangers disposed above the electrostatic shafts in the interior of the cooling tower for heating exhaust air leaving the discharge shafts.

In accordance with again a further feature of the invention the heat exchangers heat the ambient air and conduct the air above the discharge shafts into the exhaust air leaving the discharge shafts.

In accordance again an added feature of the invention the heat exchangers include heating surfaces directly contacted by the exhaust air leaving the discharge shafts.

In accordance again an additional feature of the invention the heat exchangers are heated by cooling water flowing in through the cooling tower.

In accordance yet another feature of the invention the cooling water leaves the heat exchangers at the upper region, and including a turbine feeding the cooling water to the cooling water trickling system.

In accordance yet a further feature of the invention there is provided an auxiliary heat exchanger for heating a heat transport medium with cooling water, the heat transport medium flowing in a closed circulating system through the first-mentioned heat exchangers in the upper region.

In accordance yet an added feature of the invention there are provided water collecting channels supported at lower edges of the collecting electrode of the discharge shafts.

In accordance yet an additional feature of the invention there are provided air supply regulating flaps for varying the ratio of ambient air supplied to the heat exchangers, to the cooling water trickling system and through the intake holes, as a function of weather conditions.

In accordance still a further feature of the invention there is provided a drinking and/or feed water supply system connected to the collecting devices, a collecting basin, and heat exchangers through which cooling water flows, the cooling water trickling system being operated with saline water conducted from the collecting basin through the heat exchangers.

In accordance a concomitant feature of the invention the discharge shafts include collecting devices for the precipitated water and collecting electrodes, and including a drinking and/or feed water supply system connected to the collecting devices, a collecting basin, and other heat exchangers having a cooling water side through which cooling water flows, being disposed downstream of the first-mentioned heat exchangers, the cooling water trickling system being operated with saline water conducted from the collecting basin through the other heat exchangers.

The electrostatic precipitation of the fine droplets contained in the exhaust air of the evaporation cooling tower permits the separation of relatively large amounts of liquid with low power consumption and negligibly increased flow resistance in the cooling tower. If the amounts of water so precipitated are collected in the collecting means associated with the collecting electrodes, the cooling water requirements of the power plant to be met externally are noticeably reduced at the same time. The conditions required for obtaining drinking or feed water from saline water are created if the saline water is atomized in the cooling water trickling system.

The percentage of the water to be precipitated electrostatically can be increased considerably by admixing ambient air to the moist and warm air flowing to the electrostatic discharge shafts or gaps. This favors the formation of droplets in the moist and warm air due to a distinct fall below the dew point, and the precipitation rate in the discharge shafts or gaps is increased. At the same time, this also creates the conditions for lowering the relative humidity of the exhaust air by heating it moderately, so that cooling tower clouds can be avoided with certainty under the usual, given, nonequatorial climatic conditions. It is expedient in this connection to directly subject the heat exchanger heating surfaces through which hot cooling water flows to the cooling tower, to the exhaust air leaving the discharge shafts or gaps.

Other features which are considered as characteristic for the invention are set forth on the appended claims.

Although the invention is illustrated and described herein as embodied in an evaporation cooling tower, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
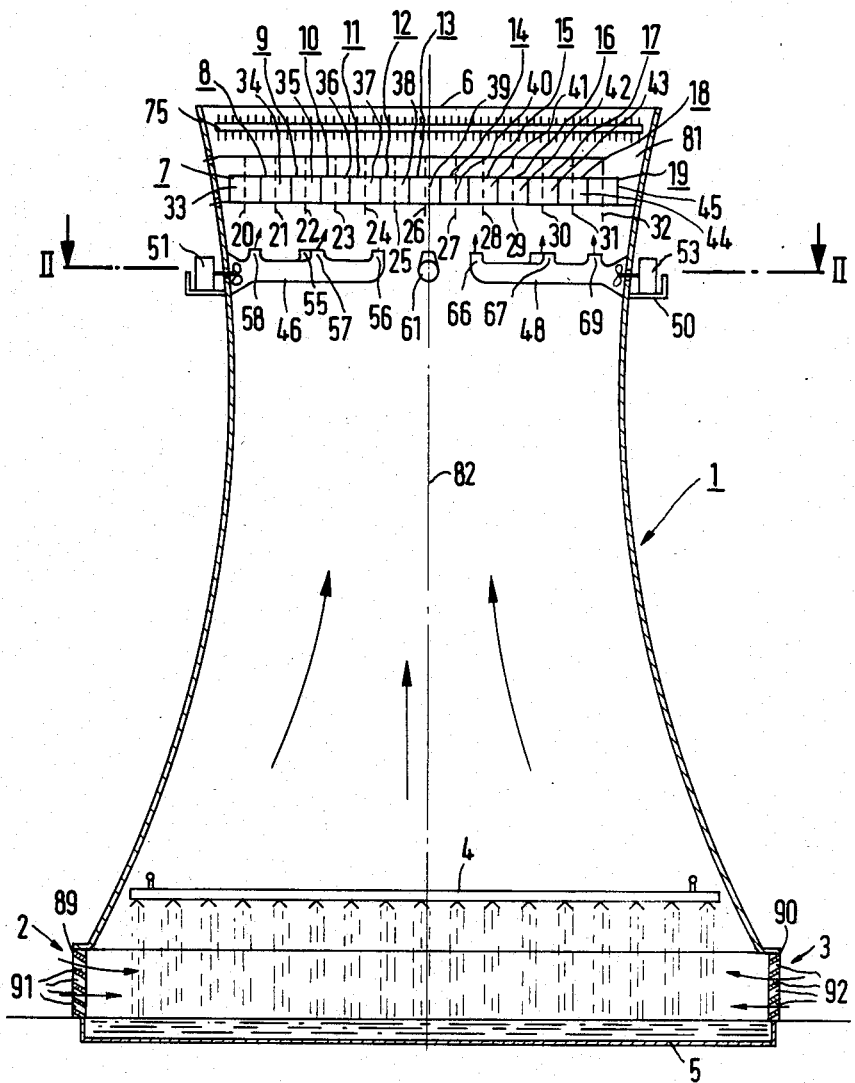
FIG. 1 is a diagrammatic, cross-sectional view of a natural-draft hybrid cooling tower according to the invention, with means for suppressing cloud formation.
Figure 2:
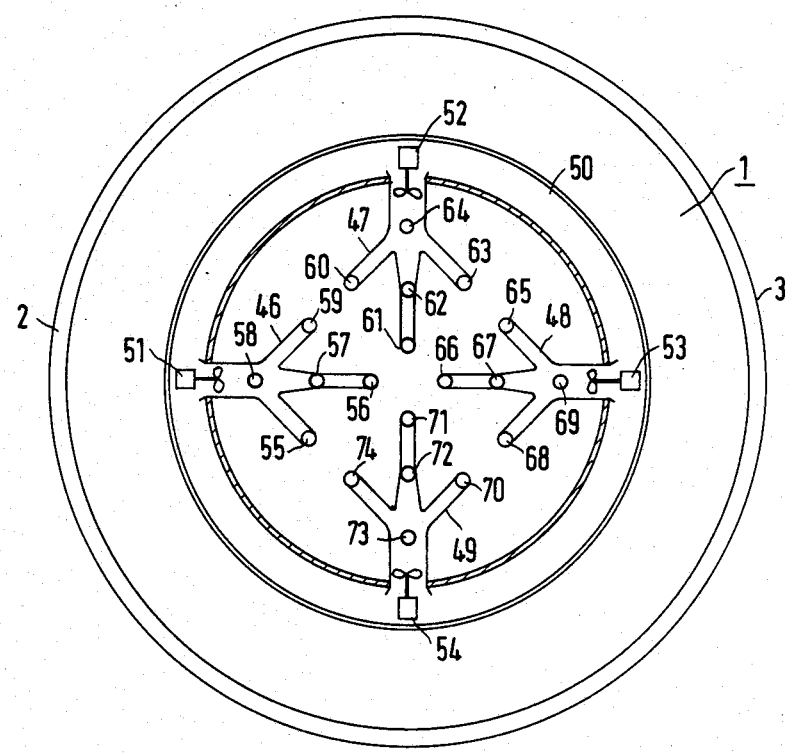
FIG. 2 is a cross-sectional view taken along the line II—II in FIG. 1. in the direction of the arrows.

Referring now, to begin with, to the figures of the drawings in detail and first, particularly, to FIGS. 1 and 2 thereof, there is seen the construction of a natural-draft cooling tower. Aspiration or intake openings 2, 3 for the ambient air are formed in the lower periphery of the tower. The lower region of the cooling tower 1 contains a cooling water trickling system 4 from which cooling water precipitates into a catch basin 5 disposed at the bottom of the cooling tower 1. The cooling tower 1 is open at its upper end 6. According to the invention, open, honeycomb-shaped electrostatic discharge gaps or shafts 7 to 19 are disposed in the upper region of the tower. Filamentary spray electrodes 20 to 32 of the gaps or shafts 7 to 19 hang through rectangular or polygonal collecting or target electrodes 33 to 45 which surround them and which are open at the top and bottom thereof. Below the discharge gaps may be seen four cold air distribution systems 46 to 49 which project radially from the outside wall of the natural-draft cooling tower 1 into the interior thereof. Each one of these cold air distribution systems 46 to 49 is fed with ambient air through a separate air distributor 51 to 54 mounted on a balcony or ledge 50 which encircles the natural-draft cooling tower 1 on the outside thereof. As is evident from the sectional view of FIG. 2, the ambient air is distributed evenly over the cross section of the cooling tower by the cold air distribution systems 46 to 49. The cool ambient air is discharged from upwardly-directed discharge nozzles 55 to 74 of the cold air distribution system. Disposed above the electrostatic discharge gaps 7 to 19 in FIG. 1 is a heat exchanger tube system 75. Exhaust air leaving the cooling tower 1 flows past the tube system 75. The hot cooling water flowing to the cooling tower flows through the heat exchanger tube system.

Figure 3:
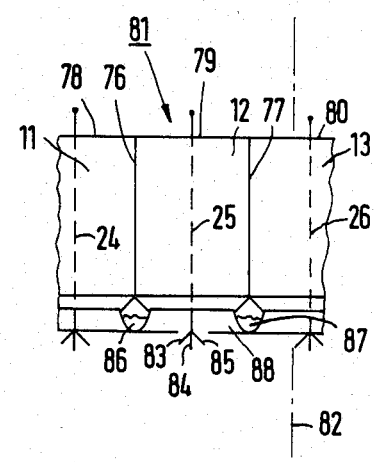
FIG. 3 is an enlarged, fragmentary, sectional view of the water collecting means associated with the collecting electrodes.

On a larger scale, FIG. 3 shows the construction of the electrostatic discharge gaps or shafts 7 to 19. The gaps or shafts are formed of sheet metal parts 76 to 80 standing on edge and joined to each other to form a honeycomb-like false bottom 81 open at the top and bottom thereof. A respective spray electrode 20 to 32 hangs through each one of the shafts thus formed so as to be aligned parallel to the cooling tower axis 82. At the lower end thereof, each of the spray electrodes 20 to 32 has several spray points 83 to 85. The spray electrodes are negatively charged, relative to the collecting electrodes 33 to 45. Disposed below the lower edges of the collecting electrodes 33–45 are mutually communicating collecting channels 86 to 88 for the separated water drops dripping from the collecting electrodes. These collecting channels 86 to 88 are connected to a non-illustrated drinking or feed water supply system not described herein in detail. Frames 89 to 90 with adjustable regulating flaps are placed in front of the aspiration openings 2, 3 for the ambient air at the lower rim of the cooling tower, to enable the inflow section to be varied.

During the operation of the natural-draft evaporation cooling tower 1, the moist and warm air in the cooling tower rises due to its lower density, thereby generating the underpressure or suction at the bottom of the cooling tower required for the aspiration or intake of the ambient air. The ambient air enters through the aspiration openings 2, 3 at the lower periphery of the cooling tower. The ambient air absorbs moisture and heat as it flows through the cooling water trickling system 4 fed by hot cooling water. In so doing, the cooling water is cooled by removal of tangible and latent heat and trickles in a cooled state into the catch basin 5 disposed at the bottom 4 of the cooling tower 1. The cooling water is then pumped back into the cooling circuit.

The rising moist and warm air is mixed with the cooler ambient air and cooled in vicinity of the cold air distribution system 46 to 49. During this process, some of the moisture condenses in the form of fine mist droplets when reaching a relative humidity of 100%. These droplets are negatively charged as they pass the spray electrodes 20 to 32 of the discharge gaps or shafts 7 to 19 so that they are electrostatically attracted by the honeycomb-shaped collecting electrodes 33 to 45 when flowing through them. The moisture droplets precipitated onto the vertical metal sheets 76 to 80 of the collecting electrodes trickle down on these metal sheets and drip from their lower edges into the collecting channels 86 to 88. From these collecting channels, the water can be conducted into a drinking and/or feed water supply system. The exhaust air leaving the discharge gaps or shafts 7 to 19 which is free of the fine droplets, passes through the heat exchanger tube system 75 located above the electrostatic discharge gaps or shafts 7 to 19 which are charged by the cooling water, while absorbing heat there. This causes the relative humidity of the air to drop so that the exhaust air is undersaturated and invisible when leaving the cooling tower 1.

In this natural-draft evaporation cooling tower 1, the formation of droplets in the rising moist and warm exhaust air (which can even start without the introduction of cool air while rising in the cooling tower) is much intensified by the introduction of cool air. It is possible in this way to precipitate far greater amounts of water in the discharge gaps or shafts 7 to 19. It is possible to vary the residual humidity of the exhaust air leaving the cooling tower within wide limits and to adapt it to the prevailing climatic conditions so that visible cooling tower clouds are avoided with certainty. This is done by matching the amount of cooling water flowing to the heat exchanger tube system 75 and the amount of air to be fed into the cold air distribution system, and by varying the aspiration section at the lower periphery of the natural draft hybrid cooling tower 1 according to the invention by adjusting the regulating flaps 91, 92 located there. The reduced buoyancy caused by blowing in cool ambient air, is compensated to a great extent by upwardly directing the discharge nozzles 55 to 74 of the cold air distribution system 46 to 49.

Due to the fact that considerable amounts of coolant can be recovered through the discharge gaps or shafts 7 to 19, the consumption of cooling water can be lowered. If, in addition, the cooling water transfers its heat to saline water, such as ocean water in a preceeding non-illustrated additional heat exchanger and if the thus heated saline water is fed to the cooling water trickling system 4, drinking or feed water can be obtained from this saline water at the collecting channels of the discharge gaps.

Figure 4:
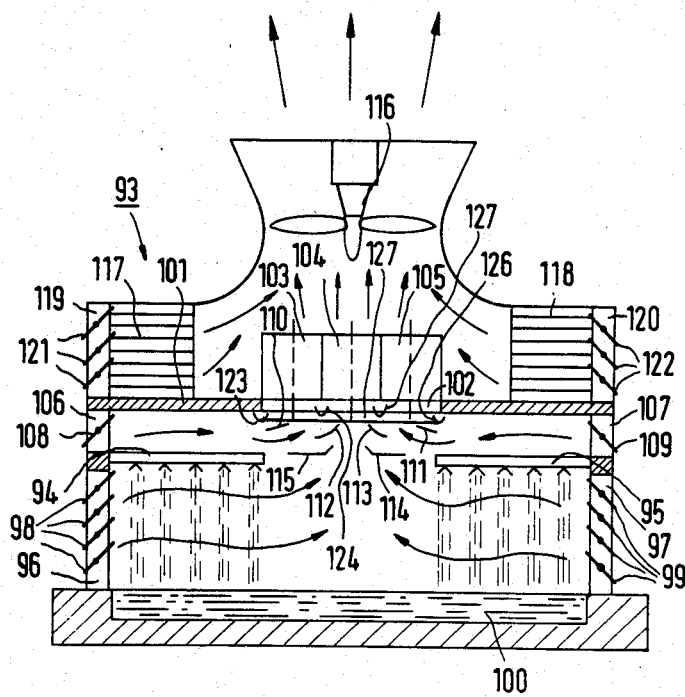
FIG. 4 is a cross-sectional view of a forced ventilation hybrid cooling tower according to the invention, with means for suppressing cloud formation.

FIG. 4 is a cross section of a forced-ventilation hybrid cooling tower 93. In the illustrated embodiment, the hybrid cooling tower is rectangular as seen from a top view, but it could just as well be cylindrical in construction. Two cooling water trickling systems 94, 95 constructed similar to those of the natural draft evaporation cooling tower 1, are disposed in the lower wall region of the forced ventilation hybrid cooling tower, on two opposite sides. Air aspiration or intake holes 96, 97 are disposed below the cooling water trickling system and recessed in the outside wall of the forced-ventilation cooling tower 93. The cross-sectioned area of the holes 96, 97 is varied by built-in air supply regulating flaps 98, 99. A water catch basin 100 is disposed at the bottom of the forced-ventilation hybrid cooling tower 93. A false bottom 101 with a central hole 102 for the air flowing through the cooling tower, is installed above the cooling water trickling systems 94, 95. Mounted above the central hole 102 in the false bottom 101 of the forced-ventilation hybrid cooling tower, is a honeycomb-shaped system of electrostatic discharge gaps or shafts 103, 104, 105 which are open at the top and bottom and correspond in principle to the discharge gaps or shafts 7 to 19 shown in FIGS. 1 and 3. These discharge gaps or shafts cover the entire cross-sectional area of the central hole 102 in the false bottom 101.

Directly below the false bottom 101 and above the cooling water trickling systems 94, 95, ambient air aspiration or intake holes 106, 107 are disposed in the outside wall of the forced-ventilation cooling tower 93. The cross-sectional area of these aspiration or intake holes is adaptable to the prevailing operating conditions by fresh air regulating flaps 108, 109. In addition, disposed in the path of this ambient air to be admixed, are a number of guide vanes 110 to 115. The vanes are joined underneath the central hole 102 in the false bottom 101 to form a cold air distribution system which uniformly mixes the laterally inflowing ambient air with the rising moist and warm exhaust air. A blower 116 for the forced ventilation of the cooling tower is mounted above the discharge gaps or shafts 103 to 105 in the embodiment of FIG. 4. Heat exchanger heating surfaces 117, 118 are disposed adjacent the electrostatic discharge gaps or shafts 103 to 105, above the false bottom 101, on the outside wall of the forced-ventilation hybrid cooling tower 93. Air aspiration or intake holes 119, 120 having cross-sectional areas which are varied by means of the regulating flaps 121, 122, are disposed in vicinity of these heat exchanger heating surfaces, on the outside wall of the forced-ventilation cooling tower. Collecting channels 123 to 127 for the precipitated water may also be seen below the vertical metal sheets of the discharge gaps or shafts 103, 104, 105 of the collecting electrodes in this cooling tower as well. These collecting channels are again connected to a non-illustrated feed water or drinking water system.

When this forced-ventilation hybrid cooling tower 93 is in operation, ambient air is aspirated through the air supply regulating flaps 98, 99 and the two cooling water trickling systems 94, 95 and is conveyed upwardly through the hole 102 in the false bottom 101 and the electrostatic discharge gaps or shafts 103 to to 105. The volume of this aspirated air can be adapted to the prevailing operating conditions by means of the air supply regulating flaps 98, 99 preceeding the cooling water trickling system. At the same time, ambient air can be admixed to the moist and warm exhaust air flowing to the discharge gaps o shafts 103 to 105 by means of the fresh air regulating flaps 108, 109 above the two cooling water trickling systems 94, 95 and below the false bottom 101. This promotes the condensation of the finest water droplets in vicinity of the discharge gaps or shafts and increases the amount of water precipitated in these discharge gaps. While the exhaust air leaving the electrostatic discharge gaps or shafts contains no water drops, it still has a relative humidity of about 100%.

Due to the heat exchanger heating surfaces 117, 118 disposed on the false bottom 101 along two mutually opposite outside walls, it is possible to admix ambient air heated by these heat exchanger heating surfaces to this moist and warm exhaust air leaving the discharge gaps 103–105. This makes it possible to reduce the relative humidity of the air far enough so that no visible clouds will form above the forced-ventilation hybrid cooling tower according to the invention, because the exhaust air leaving the cooling tower mixes with the ambient air.

In order to avoid cooling tower clouds, heating of the moist and warm exhaust air leaving the discharge gaps must be more intensive, if the outside temperature is lower and the relative humidity of the outside air is higher. Due to the fact that a majority of the humidity in the exhaust air has already been removed in the discharge gaps or shafts, less ambient air needs to be heated by the heat exchanger and admixed to the exhaust air. This makes it possible to keep the heat exchangers 117, 118 much smaller, which again reduces the cost of such a forced-ventilation cooling tower. A part of the cooling water evaporated in the cooling water trickling systems 94, 95 can be recovered in the collecting channels 123 to 127 disposed below the collecting electrodes and drinking or feed water can be obtained if saline cooling water is used in the system.

The heating of the exhaust air leaving the cooling tower by ambient air heated by the heat exchangers 117, 118 as shown in FIG. 4, can also be applied to a natural-draft cooling tower. By the same token, the direct heating of the moist and warm exhaust air by heat exchanger tube systems 75 shown in FIG. 1 for the natural-draft cooling tower, can be applied to forced-ventilation cooling towers.

I claim:

1. Evaporation cooling tower, comprising an outer tower wall defining an interior of the cooling tower having upper and lower regions and an outlet opening having a given cross section, said wall having ambient air intake holes formed in the periphery thereof at said lower region, a cooling water trickling system disposed in the interior of the cooling tower through which ambient intake air flows, collecting electrodes disposed in and entirely covering said given cross section of said outlet opening, said collecting electrodes having honeycombshaped openings formed therein with open tops and bottoms, counter electrodes in the form of filamentary spray electrodes each hanging through a respective one of said honeycomb-shaped openings of said collecting electrodes, and discharge nozzles for ambient air disposed below said collecting electrodes.

2. Evaporation cooling tower according to claim 1, wherein said collecting electrodes include collecting devices for the precipitated water.

3. Evaporation cooling tower according to claim 2, including water collecting channels supported at lower edges of said collecting electrodes.

4. Evaporation cooling tower according to claim 1, including cooling air blowers disposed directly below said honeycomb-shaped openings of said collecting electrodes in vicinity of said outer tower wall for blowing cooling air into said discharge nozzles.

5. Evaporation cooling tower according to claim 4, wherein said discharge nozzles mix the ambient air with warm and moist exhaust air flowing to said collecting electrodes and simultaneously impart a vertical flow component to the air.

6. Evaporation cooling tower according to claim 1, including heat exchangers disposed above said collecting electrodes in the interior of the cooling tower for heating exhaust air leaving said collecting electrodes.

7. Evaporation cooling tower according to claim 6, including means for feeding cooling water leaving said heat exchangers at said upper region to said cooling water trickling system.

8. Evaporation cooling tower according to claim 6, wherein said heat exchangers heat the ambient air and conduct the air above said collecting electrodes into the exhaust air leaving said collecting electrodes.

9. Evaporation cooling tower according to claim 8, wherein said heat exchangers are heated by cooling water flowing in through the cooling tower.

10. Evaporation cooling tower according to claim 8, wherein said heat exchangers include heating surfaces directly contacted by the exhaust air leaving said collecting electrodes.

11. Evaporation cooling tower according to claim 10, including air supply regulating flaps for varying the ratio of ambient air supplied to said heat exchangers, to said cooling water trickling system and through said intake holes, as a function of weather conditions.

* * * * *